Patented July 8, 1930

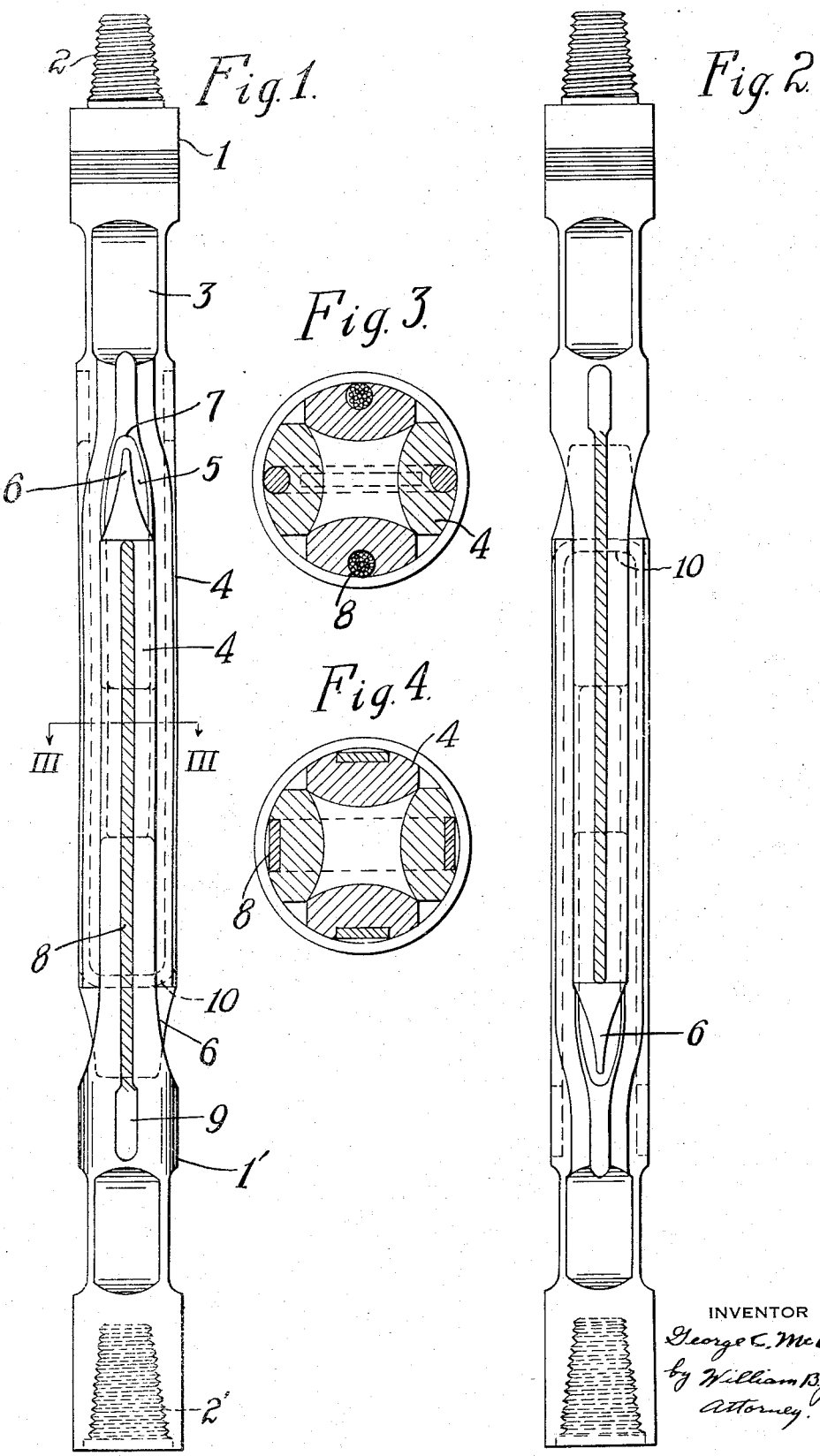

1,770,214

UNITED STATES PATENT OFFICE

GEORGE C. McCOOL, OF WASHINGTON, PENNSYLVANIA, ASSIGNOR OF ONE-HALF TO PATRICK H. YORKE, OF WASHINGTON, PENNSYLVANIA

DRILLING OR FISHING JAR

Application filed August 15, 1929. Serial No. 386,012.

This invention relates to jars used in drilling oil wells or the like, more particularly to improvements in drilling or fishing jars, whereby the loss of the tools, or a portion of them, due to breakage of the jar reins, is eliminated.

It is among the objects of the invention to provide jars with reenforcing members which are adapted to permit the removal of tools in the event that the rein or reins of the jars are fractured, without necessitating the tool fishing operation due to breakage or failure of jars.

Another object of the invention is the provision of jars with reenforcing members which are so constructed as to be free from stresses for the normal use of the jar members and which shall be adapted to function as auxiliary rein members when the primary reins are broken.

In cable tool drilling or fishing, jars are employed which permit the tools to fall by gravity on the down stroke of the string and to subsequently subject the tools to a jar or blow on the upstroke of the string of tools. These drilling or fishing jars are subjected to severe stresses and strains and are frequently broken, resulting in the loss of the tools or a portion of them, which renders it necessary to fish them out of the drill hole.

The present invention provides for the retention of the drilling or fishing tools, upon the breakage of the reins of the jars, by utilizing auxiliary reins which do not strengthen the reins in their normal use but are, for the same reason, not subjected to the stresses of the reins in normal drilling or fishing operations. In the event of breakage of the reins, these auxiliary members hold the tools, above and below the jars, to permit their removal for the renewal of the jars.

In the accompanying drawings constituting in part hereof and in which like reference characters designate like parts, Fig. 1 is a side elevational view of a drilling jar embodying the principles of this invention; Fig. 2 is a similar view taken 90° from the elevation of Fig. 1; Fig. 3 is a cross sectional view taken along the line III—III of Fig. 1; and Fig. 4 is a cross-sectional view illustrating a modification of the reenforcing or auxiliary members.

As shown in Fig. 1, the male and female jars consist of a pair of connectors 1 and 1' having taper threads 2 and 2' by means of which they are fitted to other tools and having square shanks 3 for receiving wrenches for fastening the jars to the other tools. The shanks 3 terminate in a pair of parallel reins 4 forming a slotted opening 5 in which the reins of the lower connector member are slidably engaged. The rein members 4 are looped at their ends and terminate in portions 6 designated tongues or heads which constitute abutments for shoulders 7 and the inner looped ends or tongues of the reins are abutments which are brought into cooperative engagement when the drilling jar is expanded.

In accordance with the present invention, auxiliary rein members 8 are provided which may be made of stranded wire cable or round or flat rods as shown in Figs. 3 and 4, which are fastened at their free ends, as by welding, at 9 in the shank portion of the jars and which are further looped through the loop end or tongue of the reins as at 10 so that in the event of breakage of the reins the auxiliary members function to prevent the separation of the jars. The members 8 are preferably embedded in the reins to prevent their destruction in service. By looping the auxiliary members 8 in the manner shown and then fastening them at the shank portions of the jars, they are not subjected to any stress during the drilling or fishing operation so long as the reins remain intact. When, however, the latter become fractured or broken, the auxiliary reins 8 function to prevent the lower section of the drilling tools from falling into the well, thus preventing the loss of the tools.

Although I have shown the auxiliary reins as fastened at their ends only, and as being imbedded in the rein portions of the jar, it is evident that they may be welded along the full length of reins or that they may be forged into the rein structure within the scope of this invention.

It is evident from the foregoing description that drilling or fishing jars provided with auxiliary members as herein illustrated and described, provide simple and effective means for preventing the loss of tools in drilling or fishing operations.

I claim herein as my invention:

1. A drilling or fishing jar comprising a pair of connectors in sliding engagement and having their reins provided with reenforcing strands, said strands being looped at the free ends or tongues of said reins.

2. A drilling or fishing jar comprising a pair of connectors in sliding engagement and having their reins provided with reenforcing strands, said strands being looped at the free ends or tongues of said reins and having their ends fastened to said reins.

3. A drilling or fishing jar comprising a pair of connectors in sliding engagement, having reenforcing members secured to and looped around the cooperating ends of their reins.

4. A drilling or fishing jar comprising a pair of connectors in sliding engagement, having reenforcing members of stranded cable embedded in and looped around the cooperating ends of their reins.

5. A drilling or fishing jar comprising a pair of connectors in sliding engagement, having reenforcing members embedded in and looped around the cooperating ends of their reins, said members being fastened to the shanks of the reins.

In testimony whereof I have hereunto set my hand this 9th day of August, 1929.

GEORGE C. McCOOL.